United States Patent
Kawaguchi et al.

[11] Patent Number: 6,032,757
[45] Date of Patent: Mar. 7, 2000

[54] STEERING CONTROL APPARATUS

[75] Inventors: Hiroshi Kawaguchi; Akio Okada, both of Mishima; Nobuyoshi Sugitani, Susono, all of Japan

[73] Assignee: Toyota Jidosha Kabushiki Kaisha, Toyota, Japan

[21] Appl. No.: 09/005,028

[22] Filed: Jan. 12, 1998

[30] Foreign Application Priority Data

Jan. 22, 1997  [JP]  Japan ................................ 9-009525

[51] Int. Cl.[7] ........................................................ B62D 5/04
[52] U.S. Cl. ............................ 180/446; 180/197; 180/421
[58] Field of Search .................................... 180/446, 443, 180/402, 412, 421, 422, 423, 427, 416, 197

[56] References Cited

U.S. PATENT DOCUMENTS

| | | | |
|---|---|---|---|
| 4,685,528 | 8/1987 | Suzuki et al. | 180/446 |
| 5,347,458 | 9/1994 | Serizawa et al. | 180/446 X |
| 5,511,630 | 4/1996 | Kohata et al. | 180/142 |
| 5,528,497 | 6/1996 | Yamamoto et al. | 180/446 X |
| 5,908,457 | 6/1999 | Higashira et al. | 180/446 X |

FOREIGN PATENT DOCUMENTS

| | | |
|---|---|---|
| 2-85059 | 3/1990 | Japan. |
| B2 6-98931 | 12/1994 | Japan. |

*Primary Examiner*—Matthew C. Graham
*Assistant Examiner*—Pamela J. Lipka
*Attorney, Agent, or Firm*—Oliff & Berridge, PLC

[57] ABSTRACT

A steering control apparatus of the present invention comprises: a steering shaft on which a steering effort is exerted through a steering wheel; a steering angle detecting device for detecting an angle of rotation of the steering shaft; a turning device for turning a steered wheel, the turning device being mechanically separated from the steering shaft; a target control amount calculating device for calculating a target control amount as a target of turning control, based on a detection result of the steering angle detecting device; a turning control device for outputting a turning control signal according to the target control amount to the turning device and controlling drive of the turning device so that a turning amount of the steered wheel becomes the target control amount; and a correction device for correcting the turning control signal outputted, based on a running status of a vehicle.

7 Claims, 4 Drawing Sheets

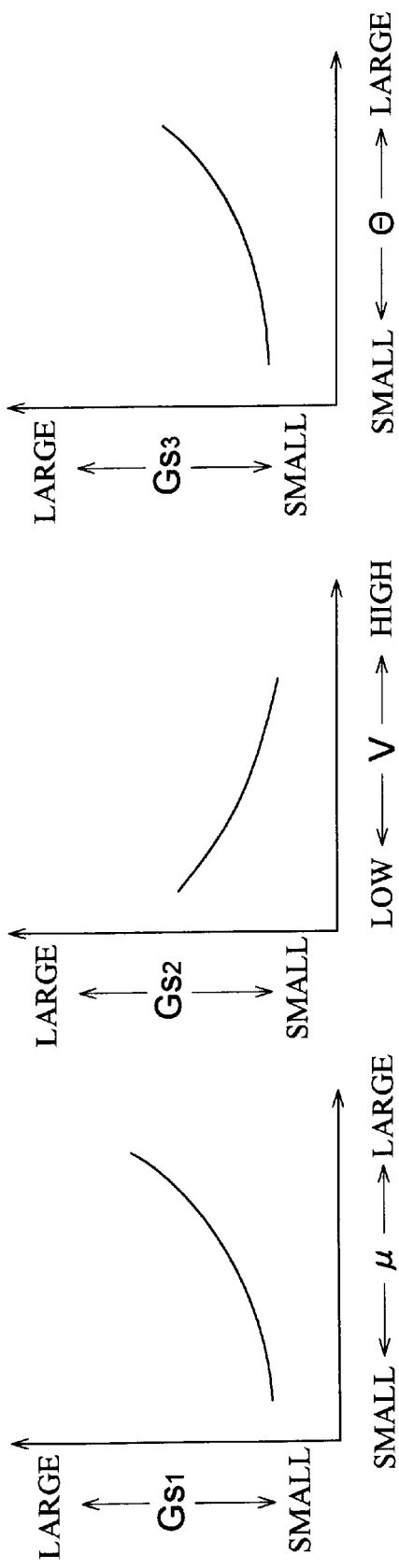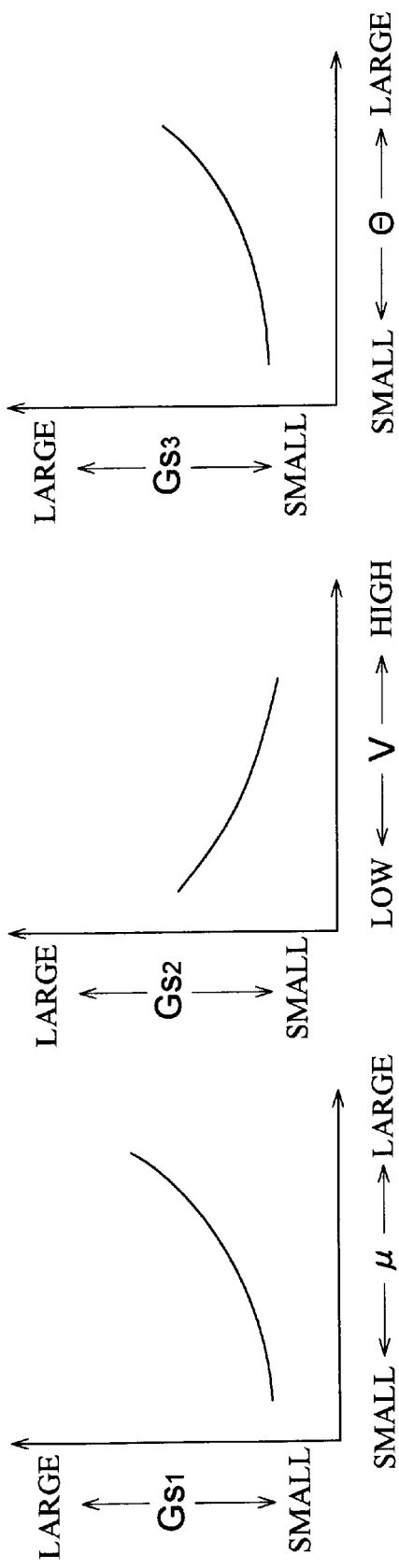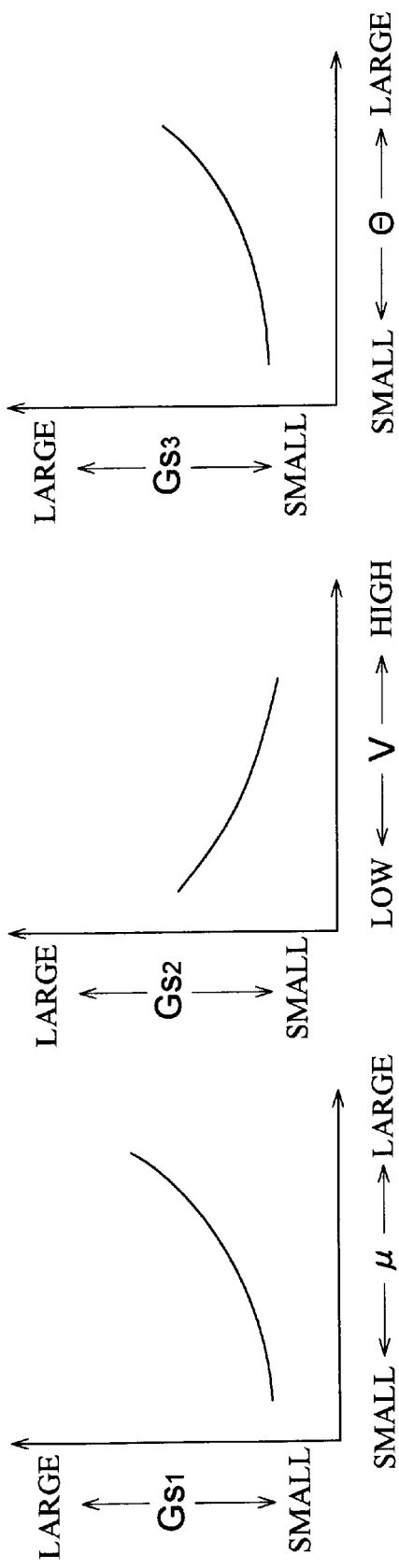

STEERING CONTROL APPARATUS

BACKGROUND OF THE INVENTION

1. Field of the Invention

The present invention relates to a steering control apparatus for turning steered wheels in accordance with rotation of a steering wheel. More particularly, the invention concerns a steering control apparatus wherein a steering shaft connected to the steering wheel is mechanically separated from a turning mechanism for turning the steered wheels and wherein the turning mechanism is controlled by an electric control device.

2. Related Background Art

An example of such steering control apparatus is described in Japanese Laid-open Patent Application No. Hei 2-85059 and the general configuration thereof is shown in FIG. 4. Steering angle sensor 103 provided on steering shaft 101 detects a steering angle of steering wheel 102 and reaction force mechanism 104, a main element of which is a motor, exerts steering reaction force on the steering shaft 101. Rotation of motor 105 for turning the tires is transmitted through reducing unit 106 to pinion 107 to axially displace rack shaft 108 in mesh with the pinion 107, thereby turning the tires 109. A displacement amount of the rack shaft 108 is detected by turning angle sensor 110 and is supplied, together with a detection signal of the steering angle sensor 103, to controller 100.

The controller 100 of the steering control apparatus constructed in the above structure performs such feedback control of motor 105 that a real steering angle obtained from the detection result of turning angle sensor 110 can be coincident with a target steering angle obtained based on the steering angle detected.

Gains in this feedback control are so set as to be always constant, regardless of the running status of vehicle. This sometimes resulted in failing to perform proper steering control, depending upon the running status of vehicle. For example, if a small gain was set despite circumstances requiring a larger gain (e.g., during running at low speed), the response of control would be slow; conversely, if a large gain was set despite circumstances requiring a smaller gain (e.g., during running at high speed), the sensitivity could be so high as to degrade stability.

SUMMARY OF THE INVENTION

The present invention has been accomplished to solve the problems described above and an object of the invention is to provide a steering control apparatus that can carry out the turning control with proper response according to the running status of vehicle.

For achieving this object, a steering control apparatus of the present invention is arranged to comprise: a steering shaft on which a steering effort is exerted through a steering wheel; steering angle detecting means for detecting an angle of rotation of the steering shaft; turning means for turning a steered wheel, the turning means being mechanically separated from the steering shaft; target control amount calculating means for calculating a target control amount as a target of turning control, based on a detection result of the steering angle detecting means; turning control means for outputting a turning control signal according to the target control amount to the turning means and controlling drive of the turning means so that a turning amount of the steered wheel becomes the target control amount; and correction means for correcting the turning control signal outputted, based on a running status of a vehicle.

The correction means corrects the steering control signal in accordance with the running status of the vehicle represented by a vehicle speed, a steering angle (rotational angle of the steering shaft), a road friction coefficient $\mu$, or the like. This permits the turning control means to control the drive of the turning means with proper response according to the running status.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 3A is a graph to show the relationship between road friction coefficient $\mu$ and gain coefficient Gs1;

FIG. 3B is a graph to show the relationship between vehicle speed V and gain coefficient Gs2;

FIG. 3C is a graph to show the relationship between steering angle $\Theta$ and gain coefficient Gs3.

DESCRIPTION OF THE PREFERRED EMBODIMENTS

An embodiment of the present invention will be described by reference to the accompanying drawings.

Figure 1:
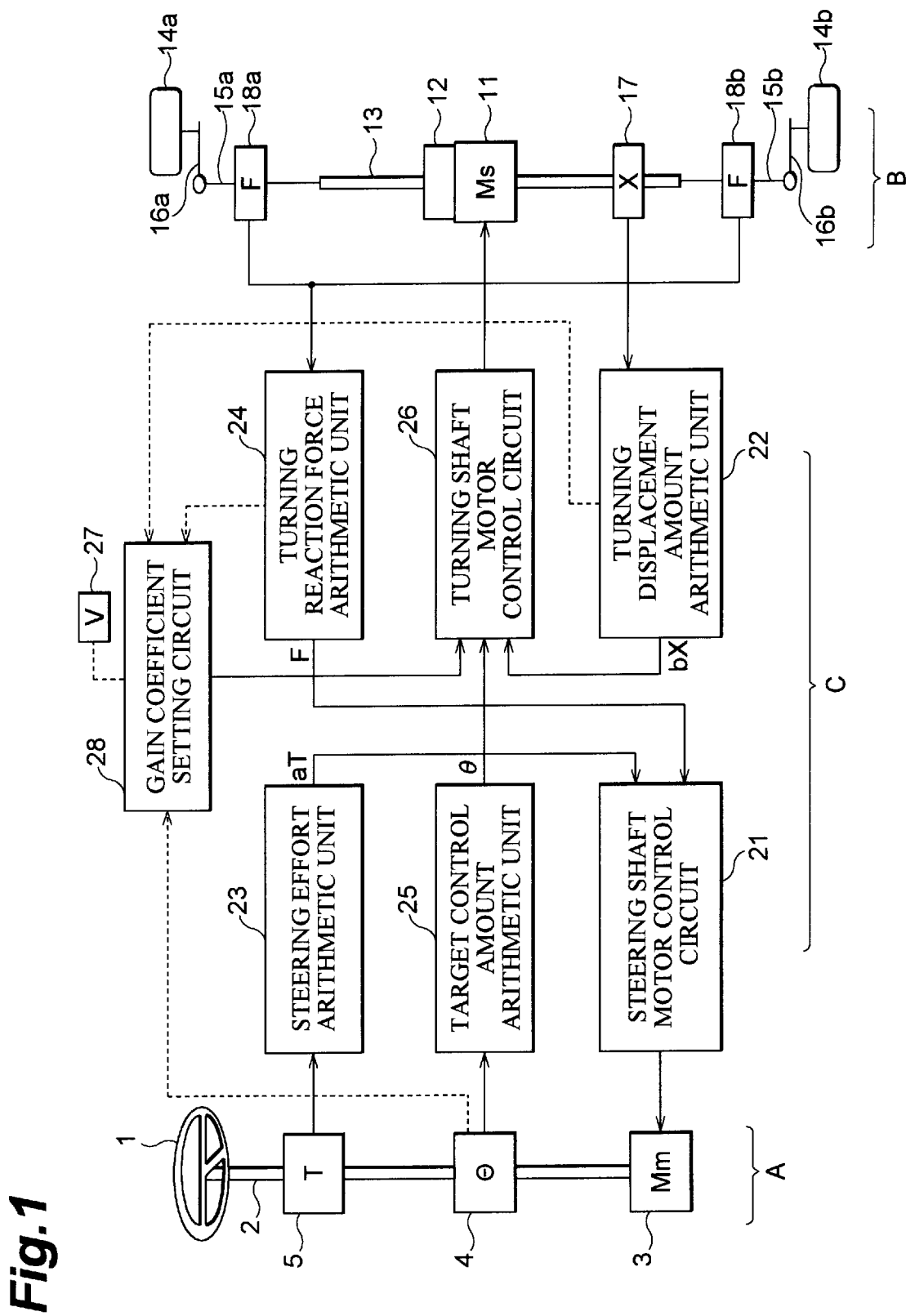
FIG. 1 is a block diagram to show the structure of a steering control apparatus according to an embodiment of the present invention.

FIG. 1 schematically shows the structure of the steering control apparatus according to the present embodiment. This steering control apparatus is composed of master section A to be manipulated by a driver, slave section B for turning the steered wheels, and control section C for electrically controlling the master section A and slave section B.

The master section A has steering shaft 2 on which steering wheel 1 is mounted, and steering shaft motor 3 for rotating the steering shaft 2, and the steering shaft 2 is provided with steering angle sensor 4 for detecting the steering angle $\Theta$ of the steering shaft 2 and steering effort sensor 5 for detecting steering effort T.

The slave section B has turning shaft motor 11 as a drive source for displacing turning shaft 13, and converter 12 for axially displacing the turning shaft 13 by converting rotational motion of the turning shaft motor 11 into rectilinear motion is provided between the turning shaft motor 11 and the turning shaft 13. Each of the two ends of the turning shaft 13 is connected through tie rod 15a, 15b and knuckle arm 16a, 16b to steered wheel 14a, 14b, thereby composing a mechanism for axially displacing the turning shaft 13 to turn each steered wheel 14a, 14b according to an amount and a direction of the displacement.

Each tie rod 15a, 15b is equipped with turning reaction force sensor 18a, 18b for detecting axial force (turning reaction force) exerted on each tie rod 15a, 15b by the left or right steered wheel 14a, 14b. The turning shaft 13 is provided with turning displacement amount sensor 17 for detecting a displacement amount of this turning shaft 13. A real turning amount of the steered wheels 14a, 14b can be detected by detecting the displacement amount of turning shaft 13 by the turning displacement amount sensor 17.

The control section C has steering shaft motor control circuit 21 for controlling the drive of steering shaft motor 3 and turning shaft motor control circuit 26 for controlling the drive of turning shaft motor 11 and performs the drive controls of the two motors, based on arithmetic results from respective arithmetic units and other data.

The steering shaft motor control circuit 21 receives arithmetic results of steering effort arithmetic unit 23 and turning reaction force arithmetic unit 24. The steering effort arithmetic unit 23 calculates the steering effort T exerted on the steering shaft 2, based on the detection result of steering effort sensor 5 and also calculates a control amount aT (where "a" is a coefficient corresponding to a gear ratio of steering effort) for rotating the steering shaft 2 in the direction of exertion of the steering effort T.

The turning reaction force arithmetic unit 24 calculates the turning reaction force F exerted on the turning shaft 13, based on the detection results of the turning reaction force sensors 18a, 18b. The steering shaft motor control circuit 21 calculates a rotation control amount Mm of the steering shaft 2 according to Eq. (1) below, based on the arithmetic results of these steering effort arithmetic unit 23 and turning reaction force arithmetic unit 24, and outputs a drive control signal according to the steering shaft rotation control amount Mm to the steering shaft motor 3. In Eq. (1) Gm is a gain coefficient indicating a gain of output signal.

$$Mm = Gm \times (aT - F) \quad (1)$$

The turning shaft motor control circuit 26 calculates a control displacement amount Ms of the turning shaft 13 according to Eq. (2) below and outputs a turning control signal according to the control displacement amount Ms to the turning shaft motor 11 to control the drive of turning shaft motor 11. In Eq. (2) Gs is a gain coefficient indicating a gain of the turning control signal and, as described hereinafter, this Gs is adjusted according to the running status of vehicle.

$$Ms = Gs \times (\theta - bX) \quad (2)$$

The turning shaft motor control circuit 26 receives arithmetic results of turning displacement amount arithmetic unit 22 and target control amount arithmetic unit 25 and also receives the gain coefficient Gs set by gain coefficient setting circuit 28.

The turning displacement amount arithmetic unit 22 obtains a displacement amount of the turning shaft 13 as a turning displacement amount X, based on the detection result of the turning displacement amount sensor 17, and outputs a control amount bX (where "b" is a coefficient corresponding to a gear ratio of turning displacement) proportional to the turning displacement amount X.

The target control amount arithmetic unit 25 calculates from the steering angle Θ detected by the steering angle sensor 4 a target control amount θ which is a target in the turning control, i.e., in turning the steered wheels 14a, 14b in correspondence to the steering angle.

The gain coefficient setting circuit 28 receives the information indicating the running status of vehicle, including the speed V detected by speed sensor 27 and the steering angle Θ detected by the steering angle sensor 4, and also receives the turning reaction force F and turning displacement amount X for calculation of road friction coefficient μ. Then the gain coefficient Gs is set based on the road friction coefficient μ, calculated from the turning reaction force F and turning displacement amount X, the speed V, and the steering angle Θ.

Based on the arithmetic results of the turning displacement amount arithmetic unit 22 and target control amount arithmetic unit 25 and the gain coefficient Gs set by the gain coefficient setting circuit 28, the turning shaft motor control circuit 26 controls the drive of the turning shaft motor 11 so that a turning amount of the steered wheels 14a, 14b becomes equal to the target control amount Θ. Namely, the control displacement amount Ms of the turning shaft 13 is calculated according to Eq. (2) and the turning control signal according to the control displacement amount Ms is outputted to the turning shaft motor 11.

The operation of the steering control apparatus constructed in the above structure will be schematically described below. Let us suppose that during straight-ahead driving of the vehicle the steering wheel 1 is so manipulated as to exert, for example, counterclockwise torque on the steering shaft 2. Since the steering shaft motor 3 is not rotating the steering shaft 2 yet at the start of rotation of steering wheel 1, torsion appears in the steering shaft 2. This torsion in the steering shaft 2 is detected by the steering effort sensor 5 and the steering effort arithmetic unit 23 calculates the steering effort T from this detection result and outputs the control amount aT obtained by multiplying the steering effort T by the coefficient a.

The steering shaft motor control circuit 21 puts the control amount aT from the steering effort arithmetic unit 23 and the turning reaction force F from the turning reaction force arithmetic unit 24 into above Eq. (1) to calculate the steering shaft rotation control amount Mm and outputs a drive control signal indicating it. Since the turning reaction force F of the turning shaft 13 is zero at the start of rotation of the steering wheel 1, the steering shaft motor 3 receives the drive control signal of Mm=Gm×aT. In response to this drive control signal, the steering shaft motor 3 rotates the steering shaft 2 counterclockwise.

This rotation causes the steering angle Θ from the steering angle sensor 4 to be supplied to the target control amount arithmetic unit 25, and the target control amount arithmetic unit 25 calculates the target control amount θ, based on the steering angle Θ, and outputs the arithmetic result to the turning shaft motor control circuit 26. At this time, since the turning displacement amount X of the turning shaft 13 is still zero, the turning shaft motor control circuit 26 outputs the control signal indicating the control displacement amount Ms=Gs×θ obtained from above Eq. (2) to the turning shaft motor 11 to start displacing the turning shaft 13 to the right and to start turning the left and right steered wheels 14a, 14b to the left.

As this displacement of the turning shaft 13 increases values of turning displacement amount X, values of control displacement amount Ms according to above Eq. (2) decrease. When the control amount bX proportional to the turning shaft displacement amount X becomes nearly equal to the target control amount θ, the motion of the turning shaft 13 stops.

On the other hand, the left and right steered wheels 14a, 14b receive rightward turning reaction force from the road surface when turned to the left. The turning reaction force sensors 18a, 18b detect force according to this turning reaction force and supply detection results to the turning reaction force arithmetic unit 24. The turning reaction force arithmetic unit 24 calculates the turning reaction force F, based on the signals from the turning reaction force sensors 18a, 18b, and outputs it to the steering shaft motor control circuit 21.

The steering shaft motor control circuit 21 calculates the rotation control amount Mm of the steering shaft 2 according to Eq. (1), based on the arithmetic results of the steering effort arithmetic unit 23 and turning reaction force arithmetic unit 24, as described previously, and outputs the drive control signal according to the steering shaft rotation control amount Mm to the steering shaft motor 3. Accordingly, an increase in the turning reaction force F due to the turning will decrease values of steering shaft rotation control amount Mm; when the turning reaction force F becomes nearly equal to the control amount aT proportional to the steering effort T, the steering shaft 2 stops at a rotational position at that time.

If the driver intends to further rotate the steering wheel 1 counterclockwise, the steering shaft motor 3 will rotate the steering shaft 2 counterclockwise and the turning shaft motor 11 will turn the steered wheels 14a, 14b to the left. Conversely, if the driver relaxes the steering effort, the control amount aT will become smaller than the turning reaction force F and values of steering shaft rotation control amount Mm will become negative. Then the steering shaft motor 3 will rotate the steering shaft 2 clockwise. Since this decreases the target control amount θ, values of turning control displacement amount Ms become negative and the turning shaft motor 11 turns the steered wheels 14a, 14b to the right.

The above operation permits proper turning of the steered wheels according to the steering operation to be carried out without degrading the preferred steering feeling.

Although the above description was given with the example of operation where the wheels are turned to the left from straight-ahead driving, the proper turning according to the steering operation can also be carried out similarly in the operation where the wheels are turned to the right from straight-ahead driving, by controlling the steering shaft motor 3 and turning shaft motor 11, based on Eqs. (1) and (2).

The fundamental steering control is performed as described above, and the control process carried out by the turning shaft motor control circuit 26 will be described in further detail herein. This turning shaft motor control circuit 26 outputs the turning control signal according to the control displacement amount Ms to the turning shaft motor 11, as described previously, and the gain coefficient Gs indicating the gain of this drive control signal is a variable coefficient. The gain coefficient Gs is set according to the running status of vehicle represented by the speed V, steering angle Θ, road friction coefficient $\mu$, or the like. This is from the following reason.

Among the turning reaction force F, reaction force from the tires attached to the steered wheels 14a, 14b (tire reaction force) differs even at the same turning angle, depending upon the running status of vehicle represented by the speed V, steering angle Θ, road friction coefficient $\mu$, or the like. The control displacement amount Ms of the turning shaft motor 11 is thus also changed according to these running conditions, thereby enhancing the response and stability of control.

Figure 2:
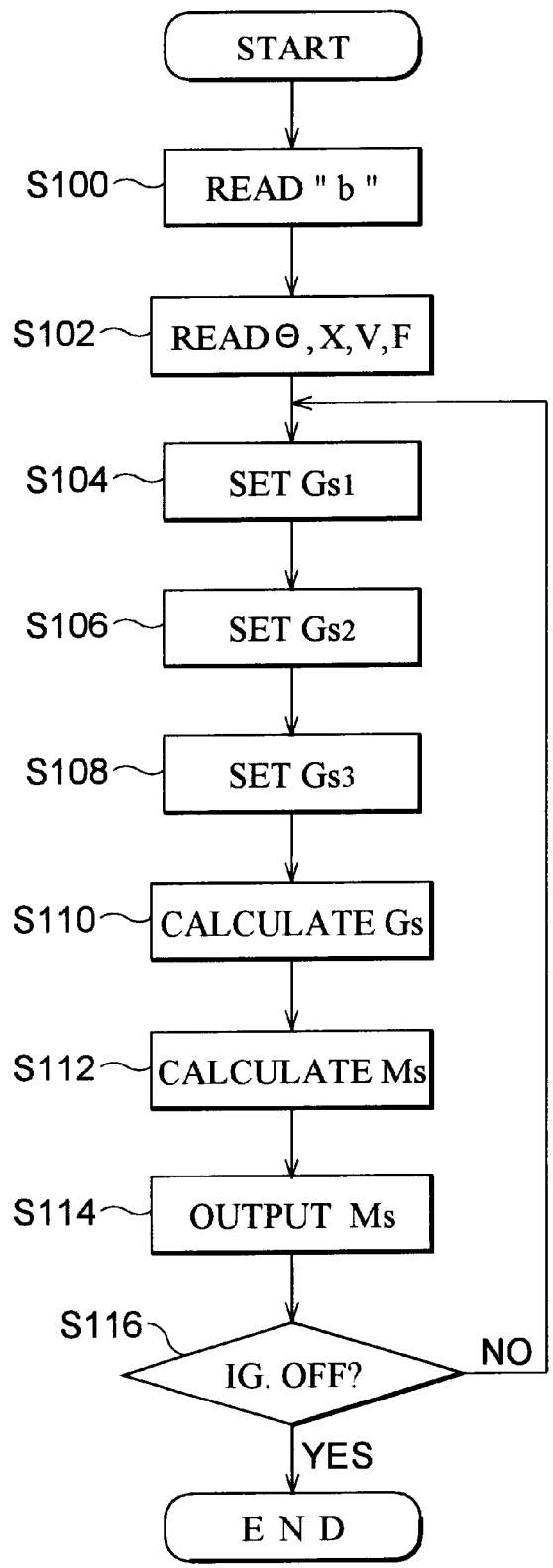
FIG. 2 is a flowchart to show a control process carried out by a turning shaft motor control circuit.
Figure 4:
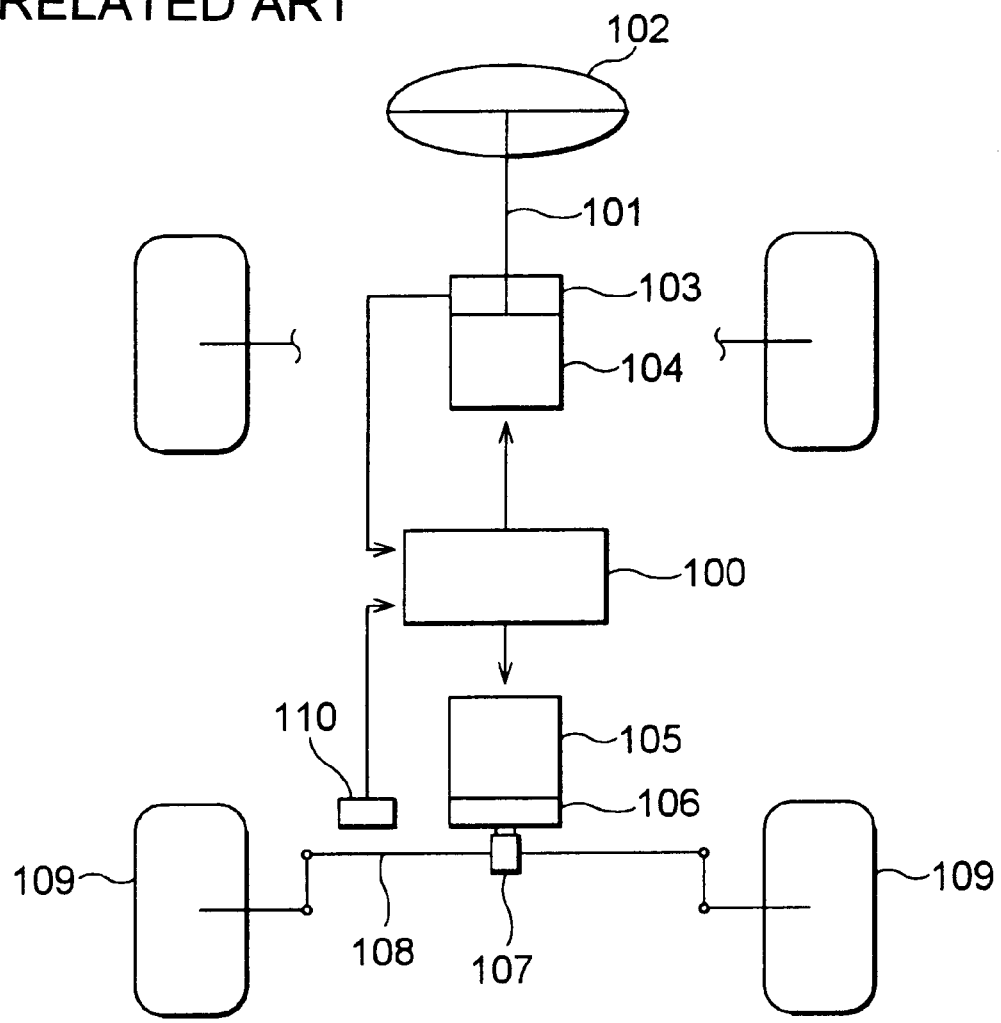
FIG. 4 is a structural drawing to schematically show a conventional steering control apparatus.

The control process carried out by the turning shaft motor control circuit 26 will be described referring to the flowchart of FIG. 2. This control process is started by turning on the ignition switch.

In step 100 ("step" will be represented hereinafter by "S"), the coefficient b corresponding to the steering displacement gear ratio, preliminarily stored in ROM, is first read and in S102 the steering angle Θ, turning displacement amount X, speed V, and turning reaction force F are read.

In S104 the value of road friction coefficient $\mu$ is retrieved from a map of relationships between turning displacement amount X corresponding to the turning angle of steered wheels 14a, 14b and axial force (turning reaction force F) of the turning shaft 13 and thereafter a gain coefficient Gsl according to the road friction coefficient $\mu$ thus retrieved is set based on the graph of FIG. 3A.

When values of road friction coefficient $\mu$ are small, divergence of the tires, i.e., divergence of the feedback system based on Eq. (2) is likely to occur, degrading stability. Thus, small values of gain coefficient Gsl are set as shown in the graph of FIG. 3A. When values of road friction coefficient $\mu$ are large, the tire reaction force is large. Thus, large values of gain coefficient Gsl are set, thereby enhancing the response of control. This adjustment of gain coefficient Gsl permits the harmonious control of response and stability to be carried out, based on the same displacement deviation amount, even with change in the road friction coefficient $\mu$.

In next step S106 a gain coefficient Gs2 according to the speed V is set based on the graph of FIG. 3B. As shown in the graph of FIG. 3B, since the divergence of tires is easier to occur with large values of speed V, the gain coefficient Gs2 is set to small values in order to enhance the stability; with small values of speed V the gain coefficient Gs2 is set to large values in order to enhance the response.

In S108 a gain coefficient Gs3 according to the steering angle Θ is set based on the graph of FIG. 3C. As shown in the graph of FIG. 3C, since the divergence of tires is easier to occur with small steering angles Θ, the gain coefficient Gs3 is set to small values; with large steering angles Θ the gain coefficient Gs3 is set to large values, because the tire reaction force is also strong. This adjustment permits the harmonious control of response and stability to be carried out, based on the same displacement deviation amount, regardless of magnitudes of steering angle Θ.

In S110, based on the gain coefficients Gs1, Gs2, and Gs3 set in S104 to S108, the gain coefficient Gs in Eq. (2) is calculated by Gs=Gs1×Gs2×Gs3. In this way the gain coefficient Gs is set, taking account of the running status of vehicle represented by the road friction coefficient $\mu$, speed V, and steering angle Θ.

In S112, using the gain coefficient Gs calculated in S110, the displacement control amount Ms is calculated according to Eq. (2) and in S114 a turning control signal according to this displacement control amount Ms is outputted to the turning shaft motor 11.

After that, it is determined in S116 whether the ignition switch is off. When the ignition switch is on, the flow returns to S102 to repeat the same process operation; if the ignition switch is off, this control process of the turning shaft motor control circuit 26 is terminated.

The embodiment described above was the example wherein in setting the gain coefficient Gs, the velocity V, steering angle Θ, and road friction coefficient $\mu$ all are taken into account as values representing the running status of a vehicle, but the gain coefficient Gs may be set based on either one or two values of them, for example, based on the speed V and steering angle Θ.

The present embodiment was the example wherein the drive control of the turning shaft motor 11 was carried out by feeding the output of turning displacement amount sensor 17 back, but the invention is not limited to the cases for carrying out such feedback control. For example, it can be contemplated that the turning shaft motor 11 is a step motor, a rotation amount of this step motor is calculated according to the target control amount θ, and rotation of the step motor is controlled based on this calculation result. In this case the feedback control is not necessary.

As described above, the steering control apparatus according to the present invention is arranged so that the correction means corrects the turning control signal outputted from the turning control means in accordance with the running status of vehicle, whereby the turning control can be carried out with proper response according to the running status of vehicle.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A steering control apparatus, comprising:

a steering shaft to which a steering wheel is mounted and on which the steering wheel exerts a steering effort;

steering angle detecting means for detecting an angle of rotation of said steering shaft;

turning means for turning a steered wheel, said turning means being mechanically separated from said steering shaft;

target control amount calculating means for calculating a target control amount as a target of turning control, based on a detection result of said steering angle detection means;

turning control means for outputting a turning control signal according to said target control amount to said turning means and controlling drive of said turning means so that a turning amount of said steered wheel becomes said target control amount; and correction means for correcting said turning control signal outputted, based on a running status of a vehicle;

wherein said turning control means calculates a control displacement amount Ms defined by the following equation:

$$Ms = Gs \times (\theta - bX)$$

where θ is said target control amount, bX is said turning amount, and Gs is a turning gain coefficient, and said turning control means outputs information including this control displacement amount Ms as the turning control signal, and said turning means turns the steered wheel according to said control displacement amount Ms obtained from said turning control means.

2. A steering control apparatus according to claim 1, wherein the correction of said turning control signal by said correction means is effected by changing said turning gain coefficient Gs, based on the running status of the vehicle.

3. A steering control apparatus according to claim 2, wherein said running status is a status concerning a vehicle speed.

4. A steering control apparatus according to claim 2, wherein said running status is a status concerning the angle of rotation of said steering shaft.

5. A steering control apparatus according to claim 2, wherein said running status is a status concerning a road friction coefficient.

6. A steering control apparatus according to claim 2, wherein said running status is a combination of two or more of those concerning a vehicle speed, the angle of rotation of said steering shaft, and a road friction coefficient.

7. A steering control apparatus according to claim 2, further comprising steering shaft driving means for rotating said steering shaft, steering shaft control means for controlling the steering shaft driving means, steering effort detecting means for detecting the steering effort exerted on said steering shaft through said steering wheel, and turning reaction force detecting means for detecting a turning reaction force exerted on said steered wheel, wherein said steering shaft control means calculates a steering rotation control amount Mm defined by the following equation:

$$Mm = Gm \times (aT - F)$$

where aT is a force proportional to said steering effort, F is a force according to said turning reaction force, and Gm is a steering gain coefficient; and wherein said steering shaft driving means rotates said steering shaft according to said steering rotation control amount Mm obtained from said steering shaft control means.

* * * * *